US009554293B2

(12) United States Patent
Keerthi

(10) Patent No.: US 9,554,293 B2
(45) Date of Patent: Jan. 24, 2017

(54) SMOOTH TRANSITION BETWEEN PREDICTIVE AND MOBILE-ASSISTED SPECTRAL ALLOCATION

(71) Applicant: Empire Technology Development LLC, Wilmington (DE)

(72) Inventor: Arvind Vijay Keerthi, Karnataka (IN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/354,116

(22) PCT Filed: Jul. 31, 2013

(86) PCT No.: PCT/US2013/053103
§ 371 (c)(1),
(2) Date: Apr. 24, 2014

(87) PCT Pub. No.: WO2014/200512
PCT Pub. Date: Dec. 18, 2014

(65) Prior Publication Data
US 2014/0376357 A1    Dec. 25, 2014

(30) Foreign Application Priority Data

Jun. 11, 2013   (IN) .......................... 2542/CHE/2013

(51) Int. Cl.
*H04W 24/08*   (2009.01)
*H04L 5/00*   (2006.01)

(52) U.S. Cl.
CPC ............ *H04W 24/08* (2013.01); *H04L 5/0057* (2013.01)

(58) Field of Classification Search
None
See application file for complete search history.

(56) References Cited

U.S. PATENT DOCUMENTS 6,125,278 A    9/2000  Wieczorek et al.
6,977,912 B1   12/2005 Porter et al.
(Continued)

FOREIGN PATENT DOCUMENTS

EP    0766901 B1   10/2004
EP    1344365 B1    2/2013

OTHER PUBLICATIONS

International Search Report and Written Opinion for PCT/US2013/047380 filed Jul. 24, 2013, mailed Aug. 30, 2013.
(Continued)

*Primary Examiner* — Donald Mills
(74) *Attorney, Agent, or Firm* — Turk IP Law, LLC

(57) ABSTRACT

Technologies are generally described for providing a transition between predictive and mobile-assisted spectral allocation. In some examples, wireless devices may be enabled to determine adequacy of theft allocated spectral path to meet their communication needs by analyzing signal-to-noise ratios (SNRs) of their assigned sub-carriers. If a wireless device determines a current sub-carrier to be inadequate based on the analysis, it may send information associated with preferred sub-carriers to a base station. The base station may determine one or more nearby good clusters based on a comparison of a sequence of received preferred sub-carriers and the spectral paths represented by the nearby cluster centers, and select a re-allocated spectral path with shortest information distance to the sequence of preferred sub-carriers.

15 Claims, 10 Drawing Sheets

(56) References Cited

U.S. PATENT DOCUMENTS

| | | | |
|---|---|---|---|
| 7,768,973 | B2 | 8/2010 | Zhu et al. |
| 8,457,036 | B2 | 6/2013 | Goldshtein et al. |
| 8,682,373 | B2 | 3/2014 | Leng et al. |
| 8,738,020 | B2 | 5/2014 | Li et al. |
| 8,886,238 | B2 | 11/2014 | Chun et al. |
| 2004/0125743 | A1 | 7/2004 | Hashem et al. |
| 2006/0068802 | A1 | 3/2006 | Benco et al. |
| 2006/0160543 | A1 | 7/2006 | Mashinsky |
| 2007/0081507 | A1 | 4/2007 | Koo et al. |
| 2007/0298821 | A1* | 12/2007 | Bush .................. H04W 84/20 455/507 |
| 2008/0057869 | A1 | 3/2008 | Strong et al. |
| 2008/0107074 | A1* | 5/2008 | Salmenkaita ....... H04W 72/082 370/330 |
| 2008/0153506 | A1 | 6/2008 | Yin et al. |
| 2008/0161033 | A1* | 7/2008 | Borran ................ H04W 52/16 455/522 |
| 2009/0296833 | A1 | 12/2009 | Sawahashi |
| 2010/0017487 | A1 | 1/2010 | Patinkin |
| 2010/0110929 | A1 | 5/2010 | Li et al. |
| 2010/0202305 | A1 | 8/2010 | Wijting et al. |
| 2010/0302956 | A1 | 12/2010 | Haverty |
| 2011/0110251 | A1* | 5/2011 | Krishnamurthy ... H04W 72/082 370/252 |
| 2011/0250916 | A1 | 10/2011 | Li et al. |
| 2011/0261781 | A1 | 10/2011 | Vrzic et al. |
| 2012/0008559 | A1* | 1/2012 | Leung .................. H04L 1/0003 370/328 |
| 2012/0214523 | A1* | 8/2012 | Senarath ............ H04W 52/146 455/501 |
| 2013/0005382 | A1 | 1/2013 | Landstrom et al. |
| 2013/0107838 | A1 | 5/2013 | Li et al. |
| 2013/0114446 | A1 | 5/2013 | Liu et al. |
| 2013/0303114 | A1 | 11/2013 | Ahmad et al. |
| 2014/0099914 | A1 | 4/2014 | Ngai |

OTHER PUBLICATIONS

"ChannelFly—Predictive Capacity Management for Smarter RF Channel Selection," accessed at www.ruckuswireless.com/technology/channelfly, Ruckus Wireless, Inc., accessed on Jul. 7, 2012, pp. 1-2.

Akram, M. "Pilot-based Channel Estimation in OFDM Systems," Master Thesis, pp. 1-80, Nokia Mobile Phones (2007).

Andrews, M., et al., "Providing Quality of Service over a Shared Wireless Link," IEEE Communications Magazine, pp. 150-154 (2001).

Beek, J., et al., "On Channel Estimation in OFDM Systems," In Proceedings of Vehicular Technology Conference (VTC '95), vol. 2, pp. 815-819, IEEE (1995).

Charrada, A. and Samet, A., Complex Support Vector Machine Regression for Robust Channel Estimation.

Coleri, S., et al., "A Study of Channel Estimation in OFDM Systems," pp. 894-898, IEEE (2002).

Combes, R., et al., "Scheduling Gain for Frequency Selective Rayleigh Fading Channels with Application to Self-Organizing Packet Scheduling," Elsevier Performance Evaluation, pp. 690-709 (2011).

Falconer, D., et al., "Frequency Domain Equalization for Single-Carrier Broadband Wireless Systems," IEEE Communications Magazine, pp. 58-66 IEEE (2002).

Ghaheri-Niri, S. and Leaves, P., "Traffic Control & Dynamic Spectrum Allocation in DRiVE," MMC 2000 Workshop, pp. 1-26, (2000).

Long, X. and Sikdar, B., "A Real-time Algorithm for Long Range Signal Strength Prediction in Wireless Networks," pp. 1120-1125.

Pagès, A. S., "A Long Term Evolution Link Level Simulator," Thesis for the degree of European Master of Research on Information and Communication Technologies, pp. 1-71 (2009).

International Search Report and Written Opinion for PCT/US2013/053103 filed Jul. 31, 2013, mailed Nov. 12, 2013, and issued Oct. 15, 2013.

* cited by examiner

SMOOTH TRANSITION BETWEEN PREDICTIVE AND MOBILE-ASSISTED SPECTRAL ALLOCATION

CROSS-REFERENCE TO RELATED APPLICATIONS

This Application is the U.S. National Stage filing under 35 U.S.C §371 of PCT Application Ser. No. PCT/US13/53103 filed on Jul. 31, 2013. The PCT Application and its priority India Application No. 2542/CHE/2013 filed Jun. 11, 2013, are herein incorporated by reference in their entireties.

BACKGROUND

Unless otherwise indicated herein, the materials described in this section are not prior art to the claims in this application and are not admitted to be prior art by inclusion in this section.

Transmission from a base-station to a mobile device may be spread across in time and frequency using a spreading technique, such as orthogonal frequency division multiple access (OFDMA). A spreading technique may be used in many modern mobile standards, such as Long Term Evolution (LTE), assigning time and frequency slots to individual user devices.

A wireless environment is a moving target. Although multipath profiles, which may depend on scattering geometry, and interference patterns, which may depend on neighboring cell activity, may indeed show location- and time-specific patterns, these patterns may be quasi-stationary, and may be expected to change over periods of time. Base stations may determine spectral allocations (time slots and frequencies or channels) for mobile devices within their coverage area to provide better signal-to-noise performance for the devices. However, a spectral allocation for a particular mobile device may not provide a satisfactory communication environment for that device. Tasking the mobile device to determine a better communication environment may be overburdening potentially limited computational resources of the mobile device. On the other hand, decision making on spectral allocation by the base station without any input from the mobile device may not be accurate.

SUMMARY

The present disclosure generally describes methods, apparatus, systems, devices, and/or computer program products for providing smooth transition between predictive and mobile-assisted spectral allocation.

In some examples, various methods for spectral allocation in wireless networks are described. An example method may include receiving preferred spectral path information from a mobile device; selecting a nearby good cluster for the preferred spectral path; and if the preferred spectral path and a nearby good cluster match a predefined criterion, scheduling a next transmission for the mobile device at one or more time-frequency vectors in the nearby good cluster.

In other examples, a controller for a wireless network configured to transition between predictive allocation and mobile-assisted spectral allocation is described. An example controller may include a communication module configured to communicate with a plurality of mobile devices over a wireless network and a processor coupled to the communication module. The processor may receive preferred spectral path information from a mobile device; select a nearby good cluster for the preferred spectral path; and if the preferred spectral path and a nearby good cluster match a predefined criterion, schedule a next transmission for the mobile device at one or more time-frequency vectors in the nearby good cluster.

In further examples, various methods for a mobile device operating in a wireless network configured to transition between predictive allocation and mobile-assisted spectral allocation are described. An example method may include determining that a quality of service (QoS) at a current spectral path is below a threshold; determining a preferred spectral path; transmitting a channel quality information (CQI) to a base station; and if a new spectral path is received from the base station, scheduling a next reception at the new spectral path, else scheduling the next reception at the preferred spectral path.

In yet other examples, a mobile device operating in a wireless network configured to transition between predictive and mobile-assisted spectral allocation is described. An example mobile device may include a communication module configured to communicate with a base station over the wireless network and a processor coupled to the communication module. The processor may determine that a quality of service (QoS) at a current spectral path is below a threshold; determine a preferred spectral path; transmit a channel quality information (CQI) to a base station; and if a new spectral path is received from the base station, schedule a next reception at the new spectral path, else schedule the next reception at the preferred spectral path.

In yet further examples, computer-readable storage media with instructions stored thereon for transitioning between predictive and mobile-assisted spectral allocation. The instructions may cause methods to be performed when executed, where the methods are similar to the methods described above.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The below described and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
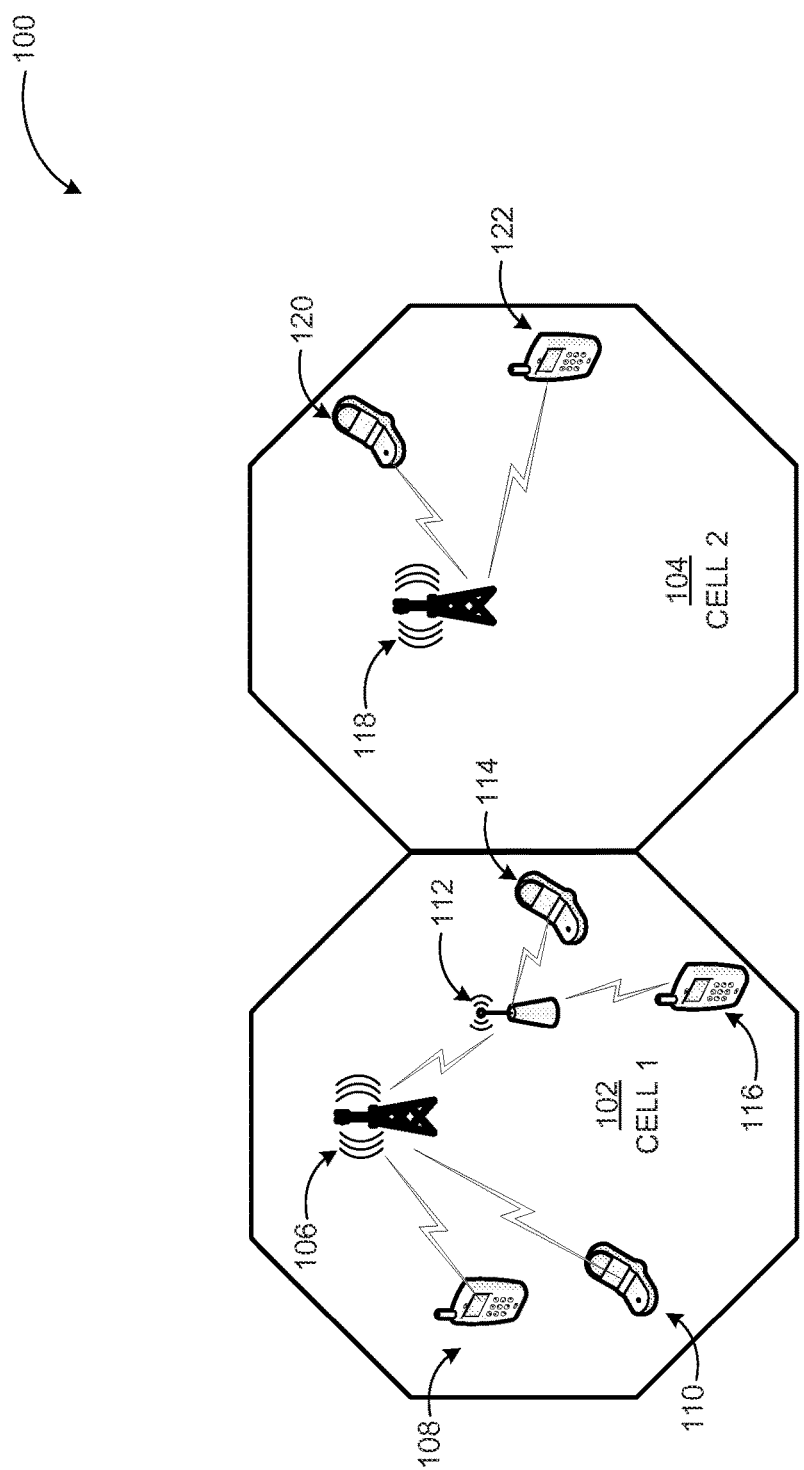
FIG. 1 illustrates two cells of an example cellular communication system, where predictive and mobile-assisted spectral allocation may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to providing smooth transition between predictive and mobile-assisted spectral allocation.

Briefly stated, technologies are generally described for providing a transition between predictive and mobile-assisted spectral allocation. In some examples, wireless devices may be enabled to determine adequacy of their allocated spectral path to meet their communication needs by analyzing signal-to-noise ratios (SNRs) of their assigned sub-carriers. If a wireless device determines a current sub-carrier to be inadequate based on the analysis, it may send information associated with preferred sub-carriers to a base station. The base station may determine one or more nearby good clusters based on a comparison of one or more received preferred sub-carriers and the spectral paths represented by the nearby cluster centers, and select a re-allocated spectral path with shortest information distance to the preferred sub-carriers.

The terms wireless device, end user device, and mobile device are used herein interchangeably referring to communication devices that are configured to communicate wirelessly with other communication devices according to a network communication protocol via one or more base stations. Cellular phones, wirelessly equipped computers (e.g., laptops, tablets, etc.) are examples of such devices. The wireless networks providing the infrastructure may employ a number of wireless communication technologies. Furthermore, the communication devices need not be mobile; they may include stationary, vehicle-mount, hand-held, wearable, and similar devices.

FIG. 1 illustrates two cells of an example cellular communication system, where predictive and mobile-assisted spectral allocation may be implemented, arranged in accordance with at least some embodiments described herein.

Some wireless communication networks, specifically cellular communication systems employ "cells" as the network infrastructure. Each cell is typically served by a base station that enables end user devices (EUs), in this case mobile devices, to communicate wirelessly with other EUs within the same cell, in other cells, and in other systems. As shown in a diagram 100, a geographic area of a wireless network may be divided into two neighboring cells, cell 1 102 and cell 2 104. Cell 1 102 may be served by a base station (BTS) 106 and may include end user devices 108, 110, 114, and 116. Cell 2 104, may be served by a base station 118 and may include end user devices 120 and 122.

In some scenarios, a relay device 112 may be employed to facilitate communication between one or more EUs (e.g., EUs 114 and 116) and their base station (e.g., BTS 106). For example, when the wireless signal is weak in a particular location due to interference, geographic structure, manmade obstructions, etc., a relay device may assist in establishing a reliable link between the base station and the EUs.

A wireless network may be one of an Evolved Universal Mobile Telecommunications System Terrestrial Radio Access Network (eUTRAN), a long term evolution (LTE) network, an LTE-Advanced network, a high speed packet access (HSPA) network, or an HSPA-Advanced network. A mobile device may include one of a cellular phone, a smart phone, a computing device equipped with cellular communication capability, or a specialized device equipped with cellular communication capability. Furthermore, a wireless communication technology between a base station and a mobile device may utilize one of frequency division multiple access (FDMA), orthogonal frequency division multiple access (OFDMA), or a narrow band allocation technology. The wireless communication between a base station and a mobile device may be subject to degradation arising out of interference from other users, frequency selectivity of the radio channel, and fading of the radio channel. It may be desirable to use time-frequency slots that provide highest quality for communication. For example, those time-frequency slots that may be least corrupted by interference or fading, and enjoy a frequency-selectivity peak. Interference may arise out of the activity of neighboring base-stations and users. However, the activity alone may not be used to indicate that interference may be high at a certain sub-carrier and low at another for a particular mobile's location. Likewise, the frequency selectivity may be dependent on the multipath profile and hence the local geography, but the dependence may not indicate which sub-carrier may have a high SNR, because the multipath profile faced by a particular mobile device may not be known. Fading may be an even more complex phenomenon depending on the speed of change of multipath.

Various statistical models and/or predicting parameters may be used to determine spectral allocations for the wireless devices, for example, by measuring/predicting a "goodness" of particular time-frequency vectors and determining good clusters of such vectors, then providing spectral allocation to the wireless devices based on their respective good clusters. Thus, a good cluster for a mobile device may be determined based on one or more of the device location, a time slot, a sub-carrier allotted for each time slot, and/or quality indicator associated with the mobile device. The good cluster may also be determined based on one or more of a channel quality indicator from the mobile devices, a received signal strength indicator (RSSI), a bit error rate (BER), a number of packet retransmissions, a signal to noise ratio (S/N), a number of call failures, a user feedback, a user requested power-down at a same bit-rate, and/or a user requested power-up. The determination of the good cluster may be dynamically adjusted based on one or more of a time of day, a day of week, a day of month, a season, and/or an expected population change within a geographic area. The determination of the good cluster may also be adjusted based on one or more of whether the device location is in a densely populated area, whether the device location is in a sparsely populated area, a communication technology of the wireless network, and/or a selected frequency of communication.

According to some example embodiments, information associated with preferred sub-carriers may be received at a base station from a wireless device, which determines a current sub-carrier to be inadequate based on analysis of one or more sub-carriers allocated to it, including the current sub-carrier. The base station may determine one or more nearby good clusters based on a comparison of the received preferred sub-carriers and the spectral paths represented by the nearby cluster centers, and select a re-allocated spectral path with shortest information distance to the received preferred sub-carriers.

Figure 2:
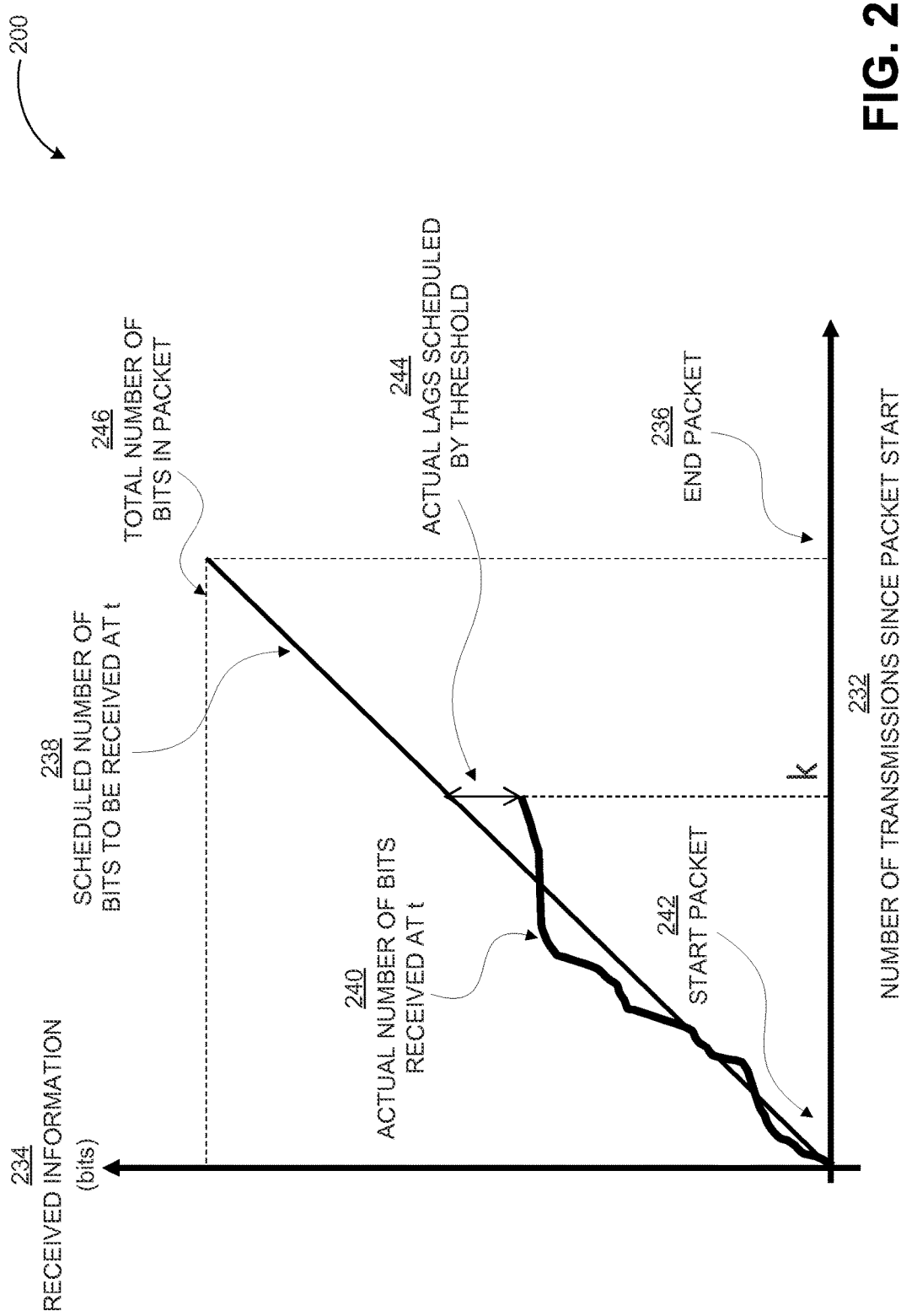
FIG. 2 illustrates determination of deficient spectral allocation at a mobile device.

FIG. 2 illustrates determination of deficient spectral allocation at a mobile device, arranged in accordance with at least some embodiments described herein.

Data packets from base stations to mobile devices may be sent in accordance with a pre-agreed modulation scheme (e.g., BPSK, 64-QAM, etc.) and an error-control coding scheme (e.g., 1/3 LDPC code). For each symbol of a given modulation scheme, there may be a maximum amount of information transportable. For example, a BPSK symbol may carry no more than one bit of information (it may carry less than one bit, if the SNR is low, but not more than one bit, even if the SNR is high). Similarly a 16-QAM transmission, which is one of 16 possible symbols, may carry no more than $\log_2 16 = 4$ bits of information per symbol. The relationship between SNR and the number of transportable bits may be derived as a special case of Shannon theorem.

In a broadband technology such as OFDM, SNR may be determined for every received symbol by interpolating pilot observations to traffic tones. By indexing SNR to modulation curves, maximum number of bits that may be carried by that symbol may be determined. For example, if the transmission is BPSK, and the SNR is 0 dB, the amount of information carried by that 0-dB-SNR symbol may be 0.7 bits. There may be some allowances needed for imperfect channel estimation, performance of implemented error-control code, and so on. These allowances may reduce slightly the number of bits transportable at a given SNR.

As the transmission moves along an allocated spectral path, meaning different allocated time-frequency slots are used for communication, the mobile device may maintain a running score of transportable bits by adding the bits-per-symbol from start-of-packet until most-recently received symbol. If the running score lags the scheduled number of bits (i.e., the number of bits expected to be received until the present time) by a more than a predefined deficit, then the packet may be presumed to be received in error. In some examples, the mobile device may request a change in spectral path in response to this determination.

Referring to FIG. 2, diagram 200 illustrates a plot of a mobile device's progression along its spectral path across number of transmissions since packet start axis 232 and received information axis 234 (in bits). As discussed above, the actual number of bits received by the mobile device may be lower than what is included in a data packet due to SNR and other factors. The actual number of bits received curve 240 varies with time (t). In an ideal scenario, the actual number of bits received curve 240 would follow a straight line from the start packet point 242 up to the end packet point 236, where the actual number of received bits would be equal to the total number of bits in the packet 246. In real world, the curve may fall below the ideal line as shown in diagram 200.

In a system according to some embodiments, the mobile device may be enabled to monitor the received information bits and compare them against the scheduled number of bits 238 at different times, t. Based on the comparison, the mobile device may determine that the received information is insufficient in the current environment (SNR) and may decide to request a new spectral allocation from the base station. The mobile device may use a threshold 244 to make such determination. In other example embodiments, the mobile device may monitor multiple sub-carriers for their performance and submit one or more preferred sub-carriers to the base station, for example, a channel state information (CSI). The base station may then take into consideration the preferred sub-carriers in selecting a new (alternate) spectral allocation for the mobile device.

In an example scenario, there may be 100 bits in a packet, which may be sent using BPSK over 300 transmissions (i.e., the error-control code has a rate of 100/300=1/3). The scheduled number of bits may be determined from ideal transmission curves for BPSK (at packet-start, zero bits are expected, at packet-end, 100 bits are expected). Thus, after 150 transmissions, (150/300)×100=50 bits may be expected to be received. The actual number of bits received—computed as a running score—may start dropping below the number of expected bits at transmission number k. That means until transmission number k, the mobile device has been receiving bits generally on schedule. However, around transmission number k, the actual number of bits starts dropping rapidly resulting in the actual bit received lagging scheduled by a significant deficit at transmission number k. The mobile device may anticipate that at the rate it is receiving bits, there may not be sufficient information to correctly decode the packet at packet-end. Thus, the mobile device may decide a course-correction is needed at transmission number k—and accordingly, request a new spectral allocation from the base station.

The threshold by which new spectral allocation may be requested may be set based on device characteristics, transmission environment (e.g., generally noisy environment vs. generally quiet environment), error-control mechanism implemented, service level agreements, and similar factors.

Figure 3:
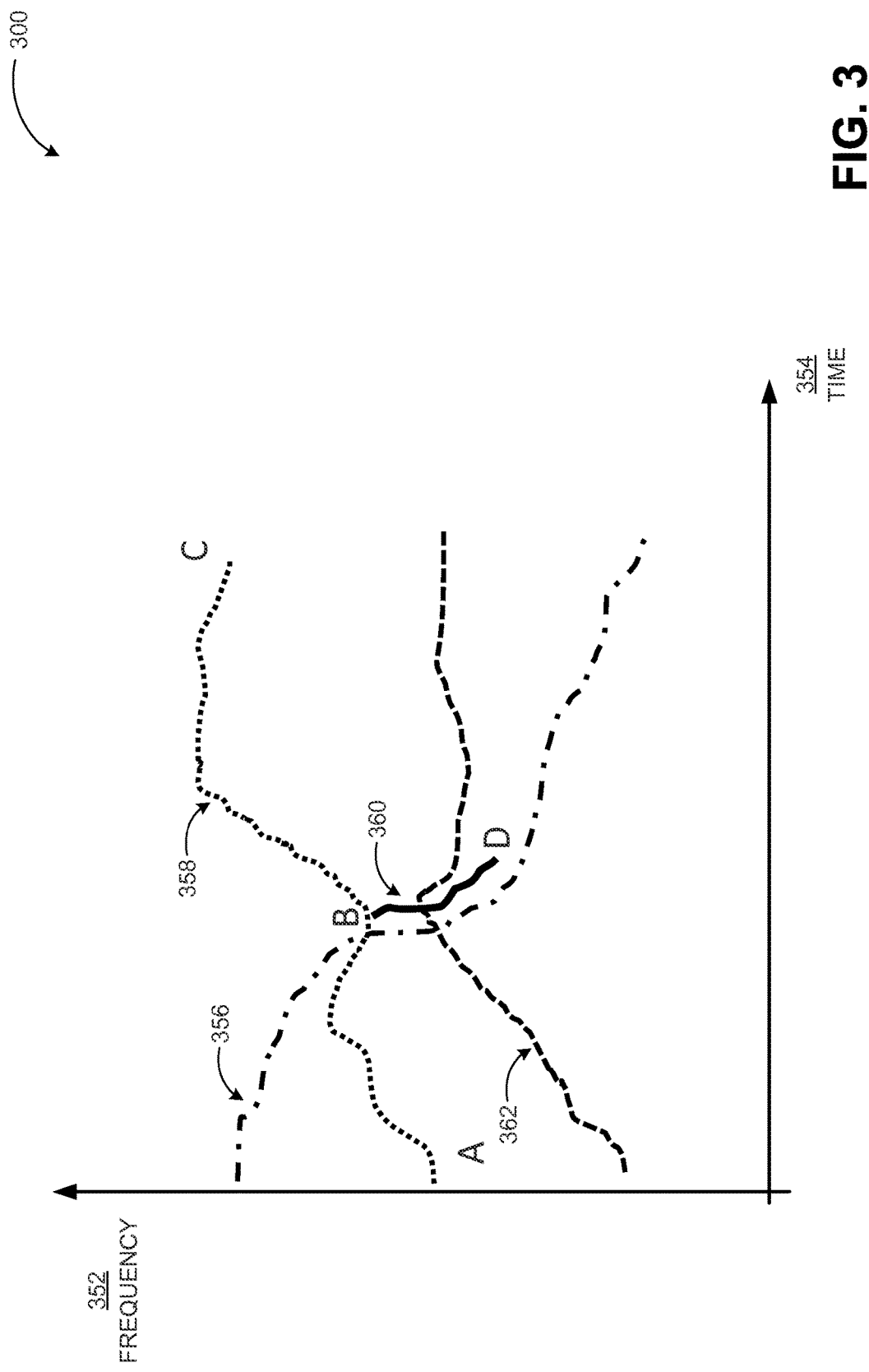
FIG. 3 illustrates determination of a spectral path closest to a mobile device's preferred spectral path.

FIG. 3 illustrates determination of a spectral path closest to a mobile device's preferred spectral path, arranged in accordance with at least some embodiments described herein.

According to some embodiments, predictive spectral allocation may not need the mobile device to transmit back CSI. If a mobile device is satisfied with the spectral allocation (based on the actual received bits, for example), then the mobile device may simply remain silent. If the current spectral allocation is not satisfactory, the mobile device may merely send back its preferred sub-carriers (based on the analysis of received SNR per-subcarrier). The receipt of a preferred sub-carrier by the base station may be an indication to the base station that the mobile device is dissatisfied.

When the mobile device requests a change in spectral allocation (e.g., by sending its preferred sub-carriers), a spectral path corresponding to a nearby cluster may be a good candidate for alternative spectral allocation. A nearby cluster, as used herein, refers to a cluster corresponding to the spatial and temporal grid points near the mobile device's present space-time coordinates. The base station may then compare a sequence of preferred time-frequency vectors (sub-carriers) recently received by the mobile device to nearby spectral paths and select a spectral path that has an information distance less than a predefined threshold. The information distance may be a vector distance, or similar metric to compare the time-frequency vectors. Any suitable metric may be used to measure the vector distance. A Hamming distance, a Levenshtein distance, or similar ones may be employed using the principles described herein Referring to diagram 300 in FIG. 3, the dotted line ABC 358 may be an originally allocated spectral path for a mobile device plotted across a time axis 354 and a frequency axis 352. In an example scenario, near point B, the mobile device may realize that the allocated spectral path is not suitable and request a change. The request may indicate that the path BD 360 may be preferred, as that may have good SNR at the mobile device's space-time location. Upon receiving the request, the base station may compare the path BD 360 with nearby cluster centers (paths 356 and 362, indicated by the dashed-dotted and dashed lines). The comparison may be performed by employing a closest string match (i.e., the spectral path closest to BD in the sense of Hamming or Levenshtein distances, for example) or similar matching mechanism to determine an alternate spectral allocation path with smallest number of changes from BD.

If a path is found that belongs to a nearby (in the space-time sense) good cluster and is close to the mobile device's stated preference, then the base-station may indicate that this new path be used for the time remaining in an analysis interval. For example, at point D and beyond, the base station may instruct the mobile device to begin using the path 356 in the example scenario of diagram 300. If no path is found that is close to the mobile device's indicated preference among the nearby clusters, the base-station may use the mobile device's preferred sub-carriers (or path) subject to scheduling constraints. The base station may continue to use the preferred sub-carriers until a sufficiently close path is discovered. Thus, predictive spectral allocation may smoothly transition to mobile-assisted spectral allocation, and mobile-assisted spectral allocation may transition back to predictive spectral allocation when a suitable alternate spectral path is found.

A parameter that may be defined is the vector distance threshold below which the mobile device's preferred path may be considered "close" to another path. In an example embodiment, the distance threshold may be set to 10%. Thus, for two paths to be considered close, the distance between the two paths may need to be less than 10% of the length of preferred path received thus far. In some examples, the threshold may be based upon the coherence bandwidth of the mobile channel. If the coherence bandwidth is high, then the threshold may be higher (i.e., the requirement for a very close match may be relaxed). If the coherence bandwidth is low, then the threshold may need to be lower. A value of the threshold that suits a variety of coherence bandwidths may be further chosen by design simulations over a wide range of coherence bandwidths, for example. In other examples, it may be possible for the mobile device to indicate back to the base station the coherence bandwidth as seen by the mobile device, which may then be used to optimize in real time the distance threshold. A mobile device may estimate coherence bandwidth by determining its multipath profile.

When the analysis interval ends, the base station may determine anew spectral path that may be acceptable to the mobile device. The new spectral path may be formed by utilizing back-and-forth transitions between predictive and mobile-assisted spectral allocation. The new spectral path may then be added to a set of spectral paths that historically have shown good performance (a "good cluster"). A support vector machine computing the clusters may be re-trained and anew separating hyperplane may be determined. The good cluster's center may change, and the change may be reflected in the base station's database, for the mobile devices to download at their convenience.

Figure 4A:
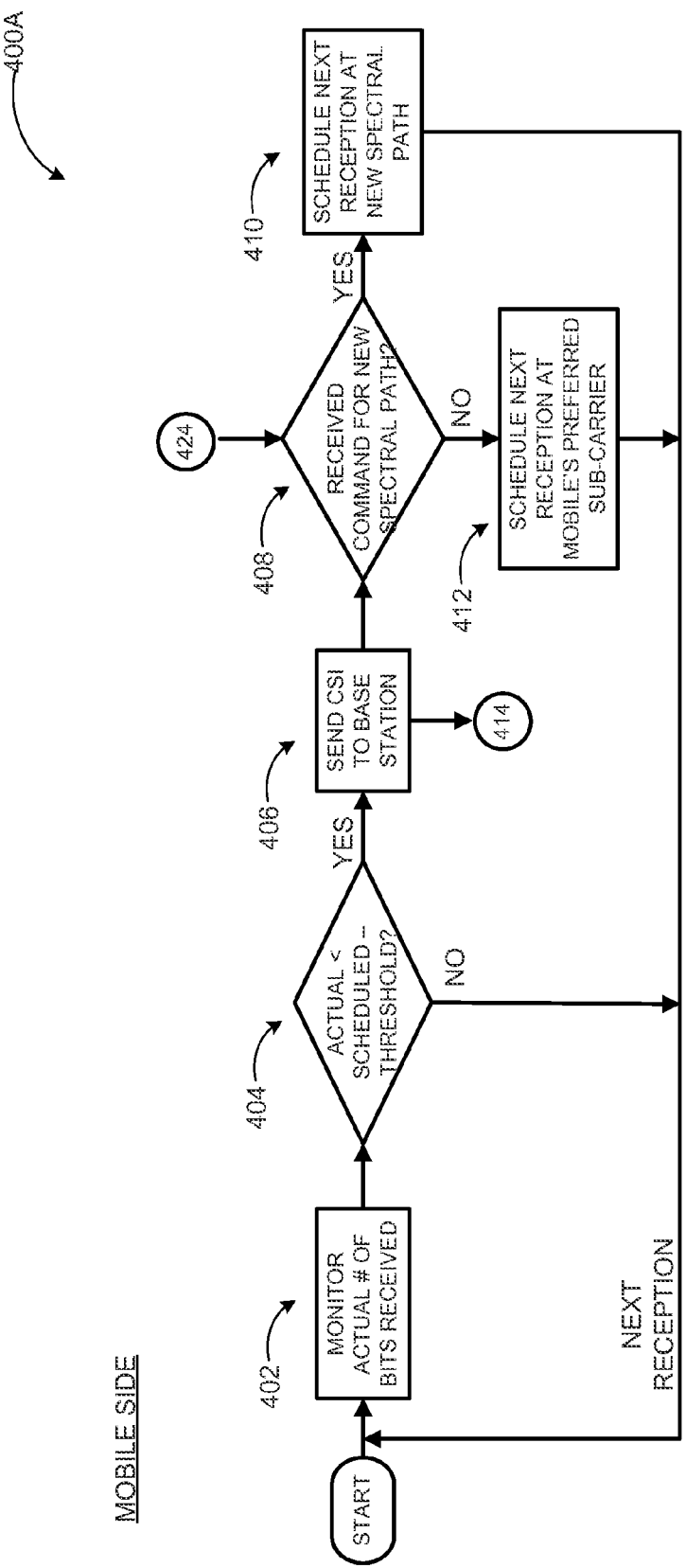
FIGS. 4A and 4B illustrate a process of transitioning between predictive and mobile-assisted spectral allocation.
Figure 4B:
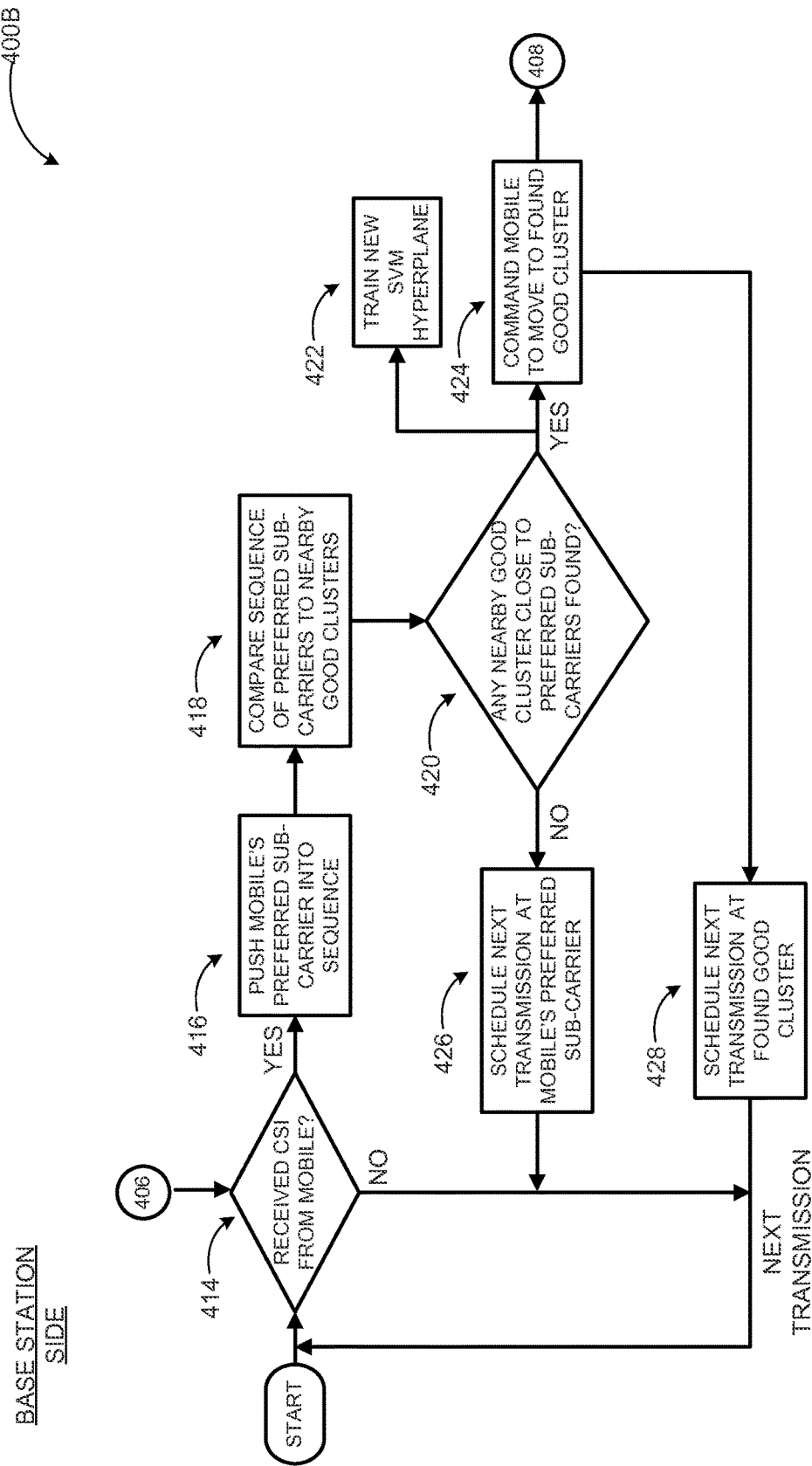

FIGS. 4A and 4B illustrate a process of transitioning between predictive and mobile-assisted spectral allocation, arranged in accordance with at least some embodiments described herein.

At a start of the process for the mobile device, as shown in diagram 400A, the mobile device may monitor the actual number of bits received 402. If the actual number of bits equals or exceeds the scheduled number of bits (less a threshold), then the present spectral path may be acceptable and no changes may be needed as shown by decision operation 404. If, on the other hand, the actual number of received bits lags the scheduled number of bits by a threshold, then the mobile device may report the CSI (i.e., its preferred sub-carriers) to the base station at operation 406. This communication is indicated by the arrow to operation 414 of diagram 400B.

On its part, the base station may proceed along a present spectral path until a CSI is received from the mobile device (406) at decision operation 414. The CSI may be considered an indication that the mobile device requests a change in its spectral allocation. Upon reception of a CSI, the base station may push the mobile device's stated sub-carrier preference into a sequence (416). The sequence may grow with each additional received CSI, and at each step of growth, it may be compared with nearby (in a space-time sense) clusters to check if any are close to the preferred spectral path (418). If no clusters are close (as compared to a threshold), as determined in the decision operation 420, then the base station may continue respecting the mobile device's preference for sub-carrier (426). This mobile-assisted phase may be carried out until such time that a suitable good cluster is found that closely matches the mobile device's recent sub-carrier preferences.

If a suitable good cluster is found at decision operation 420, the base station may declare that good cluster to be the allocated spectral path for the mobile device (424), and command the mobile device to use the selected good cluster as indicated by the arrow to operation 408 of diagram 400A. Both base-station and mobile device may then schedule communication along the newly allocated spectral path (428). The base station may include the newly allocated spectral path in new SVM training (422).

Back on the mobile device side, the instruction associated with the newly allocated spectral path received from the base station at decision operation 408 may prompt the mobile device to schedule the next reception at the new spectral path (410). Non-reception of new spectral path may prompt the mobile device to schedule the next reception at the mobile device's preferred sub-carrier (412), as shown in diagram 400A.

In some embodiments, it may be possible for the mobile device to send back to the base-station channel quality information (CQI) rather than the mobile device's preferred sub-carriers. In this case, the computational burden may pass from the mobile device to the base-station.

In other embodiments, good cluster database may be stored locally at the mobile device. Especially in cases where wireless bandwidth is at premium and mobile devices have enhanced computational/data storage capabilities, the mobile device may keep track of the locations it has been (e.g., home, office, subway, etc.) and for the grid-points within and near its typical range of movements, the mobile device may download information associated with one or more cluster centers from a serving base station. In some examples, the information may be downloaded in the background or at low-activity times with low priority to preserve bandwidth at prime times. The information may even be downloaded through other wireless networks, for example, over a wireless LAN instead of a cellular network. Gradually, the mobile device may become aware of the cluster centers for most of the grid-points within its typical geographical range of movements. When data or voice calls are placed, the mobile device may select the best spectral path based on the mobile device's location and time of day, for example.

Figure 5:
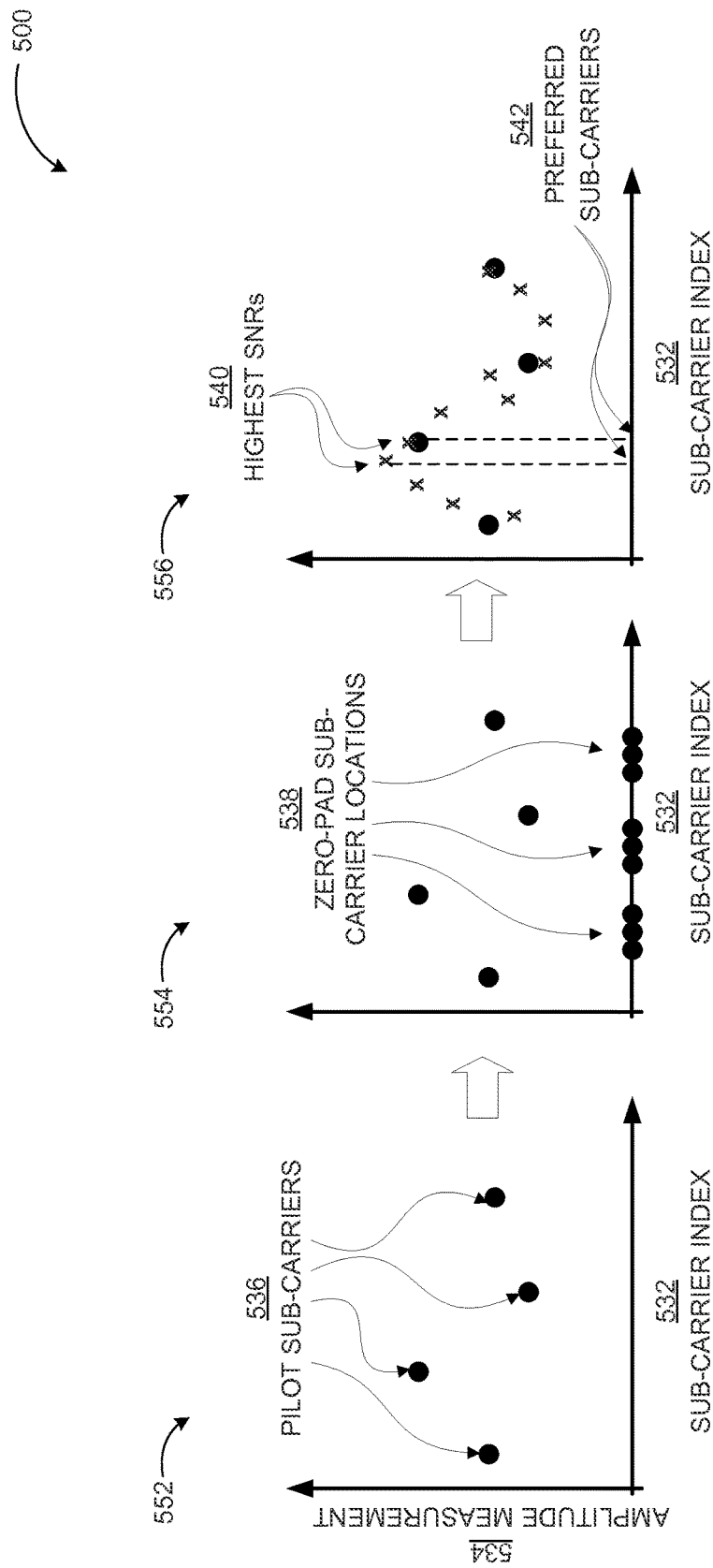
FIG. 5 illustrates an example determination of preferred sub-carriers for a mobile device through interpolation.

FIG. 5 illustrates an example determination of preferred sub-carriers for a mobile device through interpolation, arranged in accordance with at least some embodiments described herein.

As discussed above, in some embodiments, a mobile device may be enabled to monitor the channel quality for the purposes of spectral re-allocation. Such monitoring may include measurement of the SNR on the pilot sub-carriers in some examples. The pilot sub-carriers may be evenly spaced throughout the available bandwidth, and in contrast to traffic sub-carriers, carry information that is a priori known to the mobile device. The base-station may need to determine those traffic sub-carriers that have good SNR from the set of (noisy) pilot sub-carrier measurements observed by the mobile device.

The traffic subcarriers may be interspersed with the pilot sub-carriers. Thus, the base-station may need to determine SNR throughout the bandwidth by performing an interpolation from noisy measurements made intermittently through the available bandwidth. Diagram 500 illustrates an example interpolative approach. The graphs in diagram 500 corresponding to different steps in the interpolative process depict sub-carriers across sub-carrier index axis 532 and amplitude measurement axis 534.

As shown in a first step 552, the mobile device may perform amplitude measurements at pilot sub-carders 536. At the next computational step 554, zeros may be inserted at traffic carrier locations 538. A resulting vector of pilot measurements interspersed with zeros may be subject to Fourier Transform. The result of the Fourier Transform is the noise-averaged interpolated values of the traffic sub-carriers as represented by the x's at step 556. The traffic sub-carriers with the highest SNR 540 may be selected as the preferred sub-carriers 542 for the mobile device.

In assessing a trade-off between computation burden and over-the-air bandwidth, the substantial computation steps may be zero-padding and Fourier Transform, both of which may be fast and not-power intensive. If these computations are performed at the base station, then the pilot measurements taken by the mobile at the pilot sub-carriers (there may be about 100 of these in a deployment, for example) may have to be transmitted to the base-station. At an example rate of 6 bits/pilot, this may amount to about one-half kilobit. While one-half kilobit is not a prohibitive amount of data, it may still be larger than the alternative, which is for the mobile device to complete the interpolation computations and report only the top two or three traffic sub-carriers that it prefers (for example, using less than 30 bits). Thus, depending on available over-the-air bandwidth, mobile device computational capabilities, number of mobile devices served by a base station, and similar factors, the computations may be performed at the mobile devices or the base station.

Various example embodiments are described above using specific values, parameters, and configurations. These examples are for illustration purposes only and are not intended to constitute a limitation on embodiments. Embodiments may be implemented with any reasonable values and suitable parameters and configurations using the principles described herein.

Figure 6:
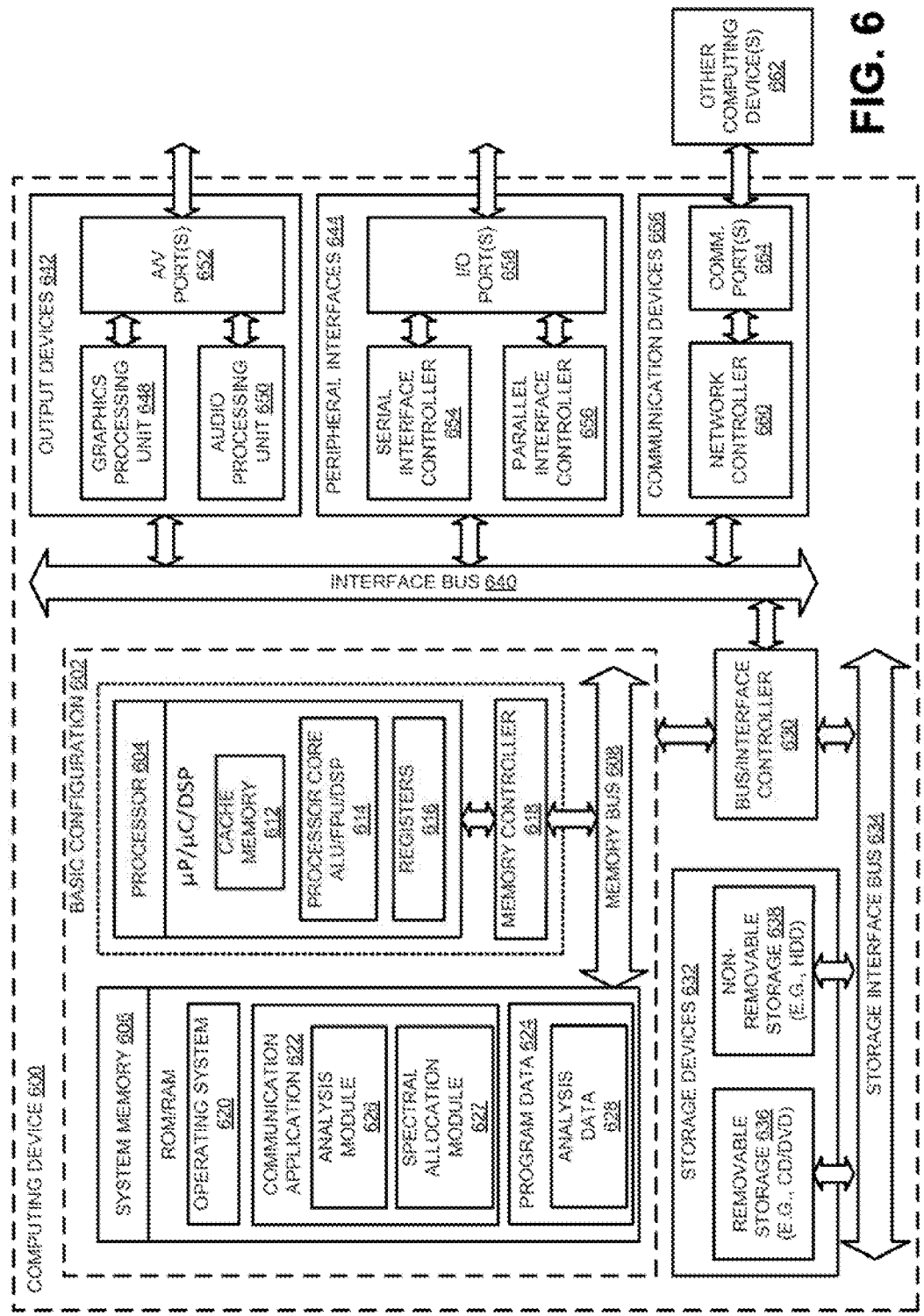
FIG. 6 illustrates a general purpose computing device, which may be used to provide smooth transition between predictive and mobile-assisted spectral allocation.

FIG. 6 illustrates a general purpose computing device, which may be used to provide smooth transition between predictive and mobile-assisted spectral allocation, arranged in accordance with at least some embodiments described herein.

In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (μP), a microcontroller (μC), a digital signal processor (DSP), or any combination thereof. Processor 604 may include one more levels of caching, such as a cache memory 612, a processor core 614, and registers 616. Example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more communication applications 622, and program data 624. Communication application 622 may include an analysis module 626 that may receive and analyze indicators associated with the sub-carrier allocations and a spectral allocation module 627 which may provide a smooth transition between predictive and mobile-assisted spectral allocation. The communication application 622 may utilize a multiple access technology such as frequency division multiple access (FDMA), orthogonal frequency division multiple access (OFDMA), Carrier-Sense Multiple Access (CSMA), or a narrow band allocation technology to enable communication between a base station and wireless devices. Program data 624 may include one or more of analysis data 628 (e.g. quality of allotted time-frequency slots, preferred spectral path information, etc.) and similar data as discussed above in conjunction with at least FIG. 1 through 5. This data may be useful for resolving spectral allocation conflicts as is described herein. This described basic configuration 602 is illustrated in FIG. 6 by those components within the inner dashed line. Computing device 600 may be implemented as a server in a wireless communication network or as part of a base station in such a network.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 666 to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 666 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a physical server, virtual server, a computing cloud, or a hybrid device that include any of the above functions. Computing device 600 may also be implemented as a personal computer including both laptop computer and non-laptop computer configurations. Moreover computing device 600 may be implemented as a networked system or as part of a general purpose or specialized server.

Networks for a networked system including computing device 600 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such as (e.g., the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Figure 7:
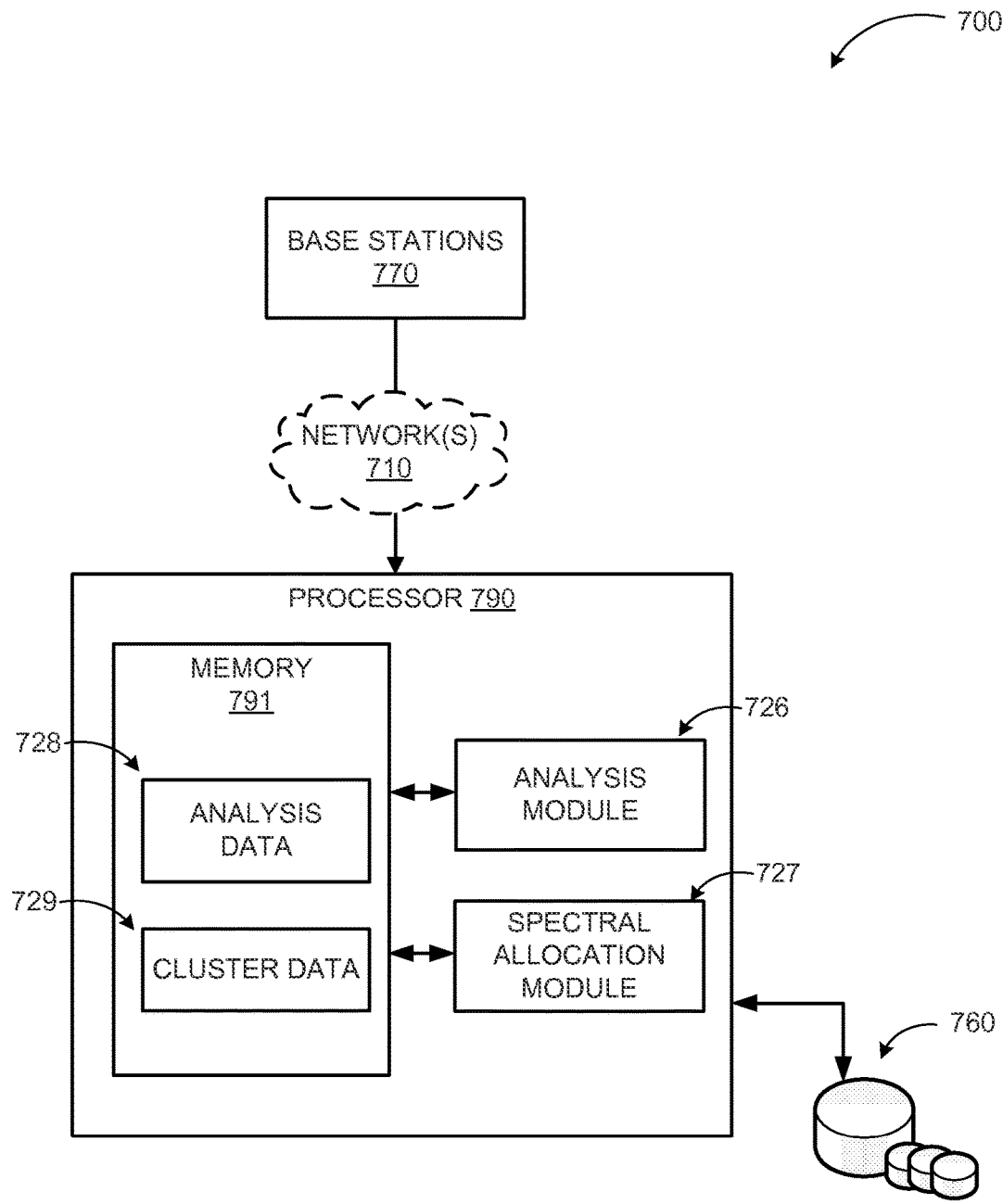
FIG. 7 illustrates a special purpose processor, which may be used to implement predictive and mobile-assisted spectral allocation in wireless networks.

FIG. 7 illustrates a special purpose processor, which may be used to implement predictive and mobile-assisted spectral allocation in wireless networks, arranged in accordance with at least some embodiments described herein.

Processor 790 may be part of a control system of base stations 770 through network(s) 710 for providing smooth transition between predictive and mobile-assisted spectral allocation, as shown in a diagram 700. Processor 790 may also communicate with data source 760 storing network related information.

Processor 790 may include a number of processing modules such as an analysis module 726 and a spectral allocation module 727. Analysis data 728 and cluster data 729 may be used by processor 790 in conjunction with the analysis module 726 and the spectral allocation module 727 to determine alternative spectral paths for a mobile device and enable smooth transition between predictive and mobile-assisted spectral allocation. Analysis data 728 and cluster data 729 may be stored during processing in memory 791, which may be a cache memory of the processor 790 or an external memory (e.g., memory external to processor 790).

Example embodiments may also include methods for providing smooth transition between predictive and mobile-assisted spectral allocation. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 8:
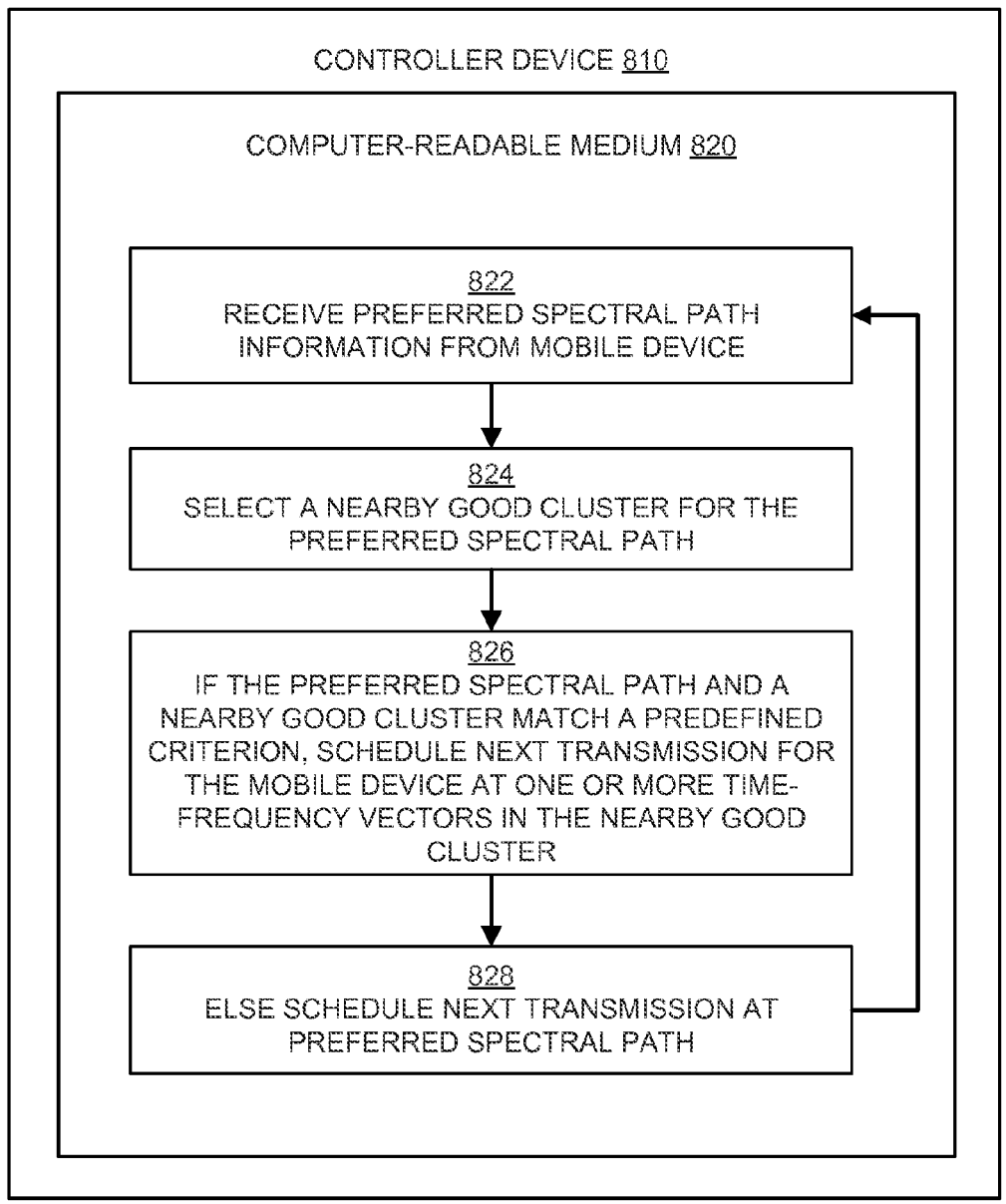
FIG. 8 is a flow diagram illustrating an example method for providing smooth transition between predictive and mobile-assisted spectral allocation that may be performed by a computing device such as the computing device in FIG. 6 or the special purpose processor of FIG. 7.

FIG. 8 is a flow diagram illustrating an example method for providing smooth transition between predictive and mobile-assisted spectral allocation that may be performed by a computing device such as the computing device in FIG. 6 or the special purpose processor of FIG. 7, arranged in accordance with at least some embodiments described herein.

Example methods may include one or more operations, functions or actions as illustrated by one or more of blocks 822, 824, 826, and 828, and may in some embodiments be performed by a computing device such as the computing device 600 in FIG. 6. The operations described in the blocks 822-828 may also be stored as computer-executable instructions in a computer-readable medium such as a computer-readable medium 820 of a controller device 810.

An example method for providing smooth transition between predictive and mobile-assisted spectral allocation may begin with block 822, "RECEIVE PREFERRED SPECTRAL PATH INFORMATION FROM MOBILE DEVICE," where processor 604 may receive preferred spectral path information such as CSI from a mobile device. The reception of the information alone may indicate to the base station (processor 604) that the mobile device is not satisfied with its current spectral allocation.

Block 822 may be followed by block 824, "SELECT A NEARBY GOOD CLUSTER FOR THE PREFERRED SPECTRAL PATH", where the processor 604 may select a nearby good cluster with known historic or other characteristics of providing good SNR to the mobile device(s).

Block 824 may be followed by block 826, "IF THE PREFERRED SPECTRAL PATH AND A NEARBY GOOD CLUSTER MATCH A PREDEFINED CRITERION, SCHEDULE NEXT TRANSMISSION FOR THE MOBILE DEVICE AT ONE OR MORE TIME-FREQUENCY VECTORS IN THE NEARBY GOOD CLUSTER", where the processor 604 may determine, for example, that a vector distance between the center of the selected good cluster and the mobile device's preferred spectral path is below a predefined distance threshold indicating that the selected good cluster meets the predefined criterion. Upon confirming the meeting of the predefined criterion, the processor 604 may schedule the mobile device to communicate through the time-frequency vectors of the selected good cluster.

Block 826 may be followed by optional block 828, "ELSE SCHEDULE NEXT TRANSMISSION AT PREFERRED SPECTRAL PATH", where the processor 604 may use the preferred spectral path received from the mobile device if the selected good cluster (or any other alternative) does not meet the predefined criterion.

The operations included in the processes of FIG. 8 described above are for illustration purposes. Providing smooth transition between predictive and mobile-assisted spectral allocation may be implemented by similar processes with fewer or additional operations. In some examples, the operations may be performed in a different order. In some other examples, various operations may be eliminated. In still other examples, various operations may be divided into additional operations, or combined together into fewer operations. Although illustrated as sequentially ordered operations, in some implementations the various operations may be performed in a different order, or in some cases various operations may be performed at substantially the same time.

Figure 9:
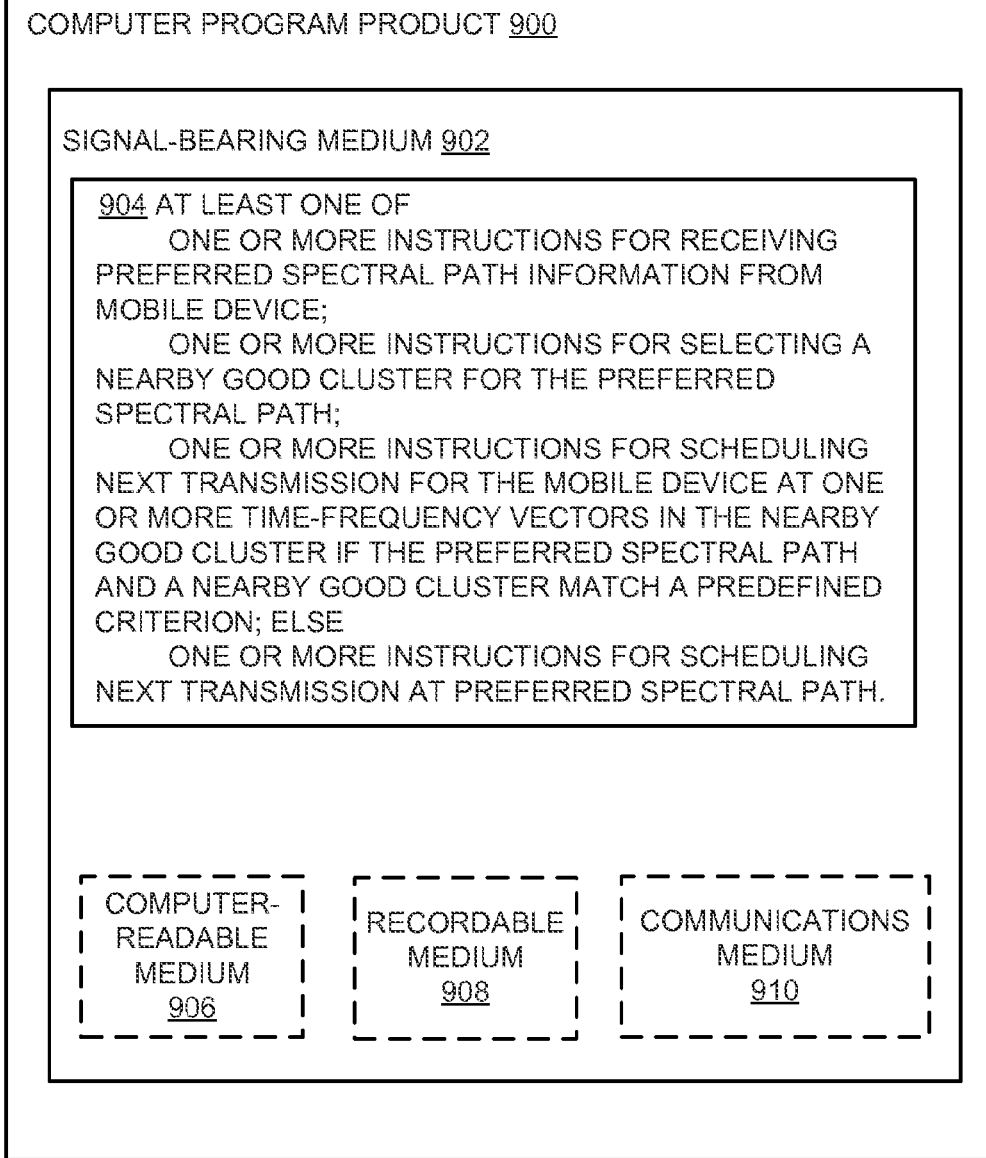
FIG. 9 illustrates a block diagram of an example computer program product for implementing smooth transition between predictive and mobile-assisted spectral allocation, all arranged in accordance with at least some embodiments described herein.

FIG. 9 illustrates a block diagram of an example computer program product for implementing smooth transition between predictive and mobile-assisted spectral allocation, arranged in accordance with at least some embodiments described herein.

In some examples, as shown in FIG. 9, computer program product 900 may include a signal bearing medium 902 that may also include machine readable instructions 904 that, when executed by, for example, a processor, may provide the functionality described above with respect to FIG. 1 through FIG. 5. Thus, for example, referring to processor 790, one or more of the tasks shown in FIG. 9 may be undertaken in response to instructions 904 conveyed to the processor 790 by signal bearing medium 902 to perform actions associated with performing smooth transition between predictive and mobile-assisted spectral allocation as described herein. Some of those instructions may include receiving preferred spectral path information from mobile device; selecting a nearby good cluster for the preferred spectral path; if the preferred spectral path and a nearby good cluster match a predefined criterion, scheduling next transmission for the mobile device at one or more time-frequency vectors in the nearby good cluster; else scheduling next transmission at preferred spectral path.

In some implementations, signal bearing medium 902 depicted in FIG. 9 may encompass a computer-readable medium 906, such as, but not limited to, a hard disk drive, a Compact Disc (CD), a Digital Versatile Disk (DVD), a digital tape, memory, etc. In some implementations, signal bearing medium 902 may encompass a recordable medium 908, such as, but not limited to, memory, read/write (R/W) CDs, R/W DVDs, etc. In some implementations, signal bearing medium 902 may encompass a communications medium 910, such as, but not limited to, a digital and/or an analog communication medium (e.g., a fiber optic cable, a waveguide, a wired communications link, a wireless communication link, etc.). Thus, for example, computer program product 900 may be conveyed to the processor 604 by an RF signal bearing medium 902, where the signal bearing medium 902 is conveyed by a wireless communications medium 910 (e.g., a wireless communications medium conforming with the IEEE 802.11 standard).

In some examples, various methods for spectral allocation in wireless networks are described. An example method may include receiving preferred spectral path information from a mobile device; selecting a nearby good cluster for the preferred spectral path; and if the preferred spectral path and a nearby good cluster match a predefined criterion, scheduling a next transmission for the mobile device at one or more time-frequency vectors in the nearby good cluster.

According to other examples, selecting the nearby good cluster may include computing a respective information distance between the preferred spectral path and one or more nearby good clusters; and based on the respective information distance, identifying a particular nearby good cluster. The particular nearby good cluster may be the good cluster that has a minimum vector distance from the preferred spectral path. The method may also include determining the one or more nearby good clusters based on a vector distance between a center of a good cluster and the preferred spectral path of the mobile device. The vector distance may be a Hamming distance or a Levenshtein distance.

According to further examples, selecting the nearby good cluster may include selecting a nearby good cluster among one or more nearby good clusters with the vector distance between a center of the nearby good duster and the preferred spectral path less than a predefined distance threshold. The predefined distance threshold may include about 10%. The method may also include determining the predefined distance threshold based on a coherence bandwidth of the mobile device. The preferred spectral path for the mobile device may include a subset of time-frequency vectors allocated to the mobile device with signal-to-noise ratios (SNRs) higher than a predefined threshold.

According to yet other examples, receiving the preferred spectral path information may include receiving sub-carrier specification information for one or more preferred sub-carriers from the mobile device. The method may further include using a string matching technique to determine if the preferred spectral path and the nearby good cluster match the predefined criterion, receiving the preferred spectral path information from the mobile device in form of channel state information (CSI), or scheduling the next transmission at the preferred spectral path if the predefined criterion is not matched. The nearby good cluster may be a good cluster that corresponds to spatial- and/or temporal grid points surrounding the mobile device's present space and/or time coordinates.

In other examples, a controller for a wireless network configured to transition between predictive allocation and mobile-assisted spectral allocation is described. An example controller may include a communication module configured to communicate with a plurality of mobile devices over a wireless network and a processor coupled to the communication module. The processor may receive preferred spectral path information from a mobile device; select a nearby good cluster for the preferred spectral path; and if the preferred spectral path and a nearby good cluster match a predefined criterion, schedule a next transmission for the mobile device at one or more time-frequency vectors in the nearby good cluster.

According to some examples, the processor may select the nearby good cluster by computing a respective information distance between the preferred spectral path and one or more nearby good clusters; and based on the respective information distance, identifying a particular nearby good cluster. The particular nearby good cluster may be the good cluster that has a minimum vector distance from the preferred spectral path. The processor may determine the one or more nearby good clusters based on a vector distance between a center of a good cluster and the preferred spectral path of the mobile device. The vector distance may be a Hamming distance or a Levenshtein distance.

According to further examples, the processor may select the nearby good cluster by selecting a nearby good cluster among one or more nearby good clusters with the vector distance between a center of the nearby good cluster and the preferred spectral path less than a predefined distance threshold. The predefined distance threshold may be about 10%. The processor may also determine the predefined distance threshold based on a coherence bandwidth of the mobile device. The preferred spectral path for the mobile device may include a subset of time-frequency vectors allocated to the mobile device with signal-to-noise ratios (SNRs) higher than a predefined threshold. The processor may also receive the preferred spectral path information by receiving sub-carrier specification information for one or more preferred sub-carriers from the mobile device.

According to yet other examples, the processor may use a string matching technique to determine if the preferred spectral path and the nearby good cluster match the predefined criterion, or receive the preferred spectral path information from the mobile device in form of channel state information (CSI). The processor may further schedule the next transmission at the preferred spectral path if the predefined criterion is not matched. The nearby good cluster may be a good cluster that corresponds to spatial- and/or temporal grid points surrounding the mobile device's present space and/or time coordinates. The controller may be part of a base station. The wireless network may be an Evolved Universal Mobile Telecommunications System Terrestrial Radio Access Network (eUTRAN), a long term evolution (LTE) network, an LTE-Advanced network, a high speed packet access (HSPA) network, or an advanced HSPA network.

In further examples, various methods for a mobile device operating in a wireless network configured to transition between predictive allocation and mobile-assisted spectral allocation are described. An example method may include determining that a quality of service (QoS) at a current spectral path is below a threshold; determining a preferred spectral path; transmitting a channel quality information (CQI) to a base station; and if a new spectral path is received from the base station, scheduling a next reception at the new spectral path, else scheduling the next reception at the preferred spectral path.

According to some examples, the method may also include determining if the QoS is below the threshold comprises monitoring an actual number of bits received and comparing the actual number of bits received to a scheduled number of bits received, prorating the comparison to a fraction of a packet that has been transmitted by the base station, or adjusting the comparison based on one or more of a utilized error correction mechanism and a channel condition.

According to other examples, the method may further include performing amplitude measurements at one or more pilot sub-carriers; setting amplitude value to zero at one or more traffic sub-carriers; performing a Fourier transform of a combination vector of the pilot and traffic sub-carriers; and determining one or more traffic sub-carriers with highest signal to noise ratios (SNRs) as preferred sub-carriers for the mobile device.

In yet other examples, a mobile device operating in a wireless network configured to transition between predictive and mobile-assisted spectral allocation is described. An example mobile device may include a communication module configured to communicate with a base station over the wireless network and a processor coupled to the communication module. The processor may determine that a quality of service (QoS) at a current spectral path is below a threshold; determine a preferred spectral path; transmit a channel quality information (CQI) to a base station; and if a new spectral path is received from the base station, schedule a next reception at the new spectral path, else schedule the next reception at the preferred spectral path.

According to some examples, the processor may determine if the QoS is below the threshold by monitoring an actual number of bits received and comparing the actual number of bits received to a scheduled number of bits received. The processor may also prorate the comparison to a fraction of a packet that has been transmitted by the base station. The processor may yet adjust the comparison based on one or more of a utilized error correction mechanism and a channel condition.

According to other examples, the processor may perform amplitude measurements at one or more pilot sub-carriers; set amplitude value to zero at one or more traffic sub-carriers; perform a Fourier transform of a combination vector of the pilot and traffic sub-carriers; and determine one or more traffic sub-carriers with highest signal to noise ratios (SNRs) as preferred sub-carriers for the mobile device. The processor may also provide coherence bandwidth information associated with the new spectral path to the base station. The wireless network may be an Evolved Universal Mobile Telecommunications System Terrestrial Radio Access Network (eUTRAN), a long term evolution (LTE) network, an LTE-Advanced network, a high speed packet access (HSPA) network, or an advanced HSPA network.

In yet further examples, computer-readable storage media with instructions stored thereon for transitioning between predictive and mobile-assisted spectral allocation. The instructions may cause methods to be performed when executed, where the methods are similar to the methods described above.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for spectral allocation in wireless networks, the method comprising:
   receiving information pertaining to a preferred spectral path from a mobile device, the preferred spectral path comprising a subset of time-frequency vectors allocated to the mobile device with signal-to-noise ratios (SNRs) higher than a predefined threshold;
   selecting a particular nearby cluster for the preferred spectral path, wherein the particular nearby cluster corresponds to spatial and temporal grid points near present space-time coordinates of the mobile device;
   comparing the preferred spectral path to the particular nearby cluster to determine whether the particular nearby cluster has a time-frequency vector distance that is less than a particular threshold; and
   in response to a determination that the particular nearby cluster has a time-frequency vector distance that is less than the particular threshold, forming a new spectral path by scheduling a next transmission for the mobile device at one or more time-frequency vectors in the particular nearby cluster and adding the new spectral path to a set of spectral paths associated with acceptable performance: else
   scheduling the next transmission for the mobile device at the preferred spectral path received from the mobile device until another particular nearby cluster is determined to have a time-frequency vector distance that is less than the particular threshold when compared to the preferred spectral path.

2. The method according to claim 1, wherein selecting the particular nearby cluster comprises:
   computing, a respective information distance between the preferred spectral path and one or more nearby clusters; and
   based on the respective information distance, identifying the particular nearby cluster.

3. The method according to claim 2, wherein the particular nearby cluster is a good cluster that has a minimum vector distance from the preferred spectral path.

4. The method according to claim 1, wherein the time-frequency vector distance is one of a Hamming distance and a Levenshtein distance.

5. The method according to claim 1, wherein selecting, the particular nearby cluster comprises selecting the particular nearby duster among one or more nearby clusters with the time-frequency vector distance between a center of the nearby cluster and the preferred spectral path less than the particular threshold.

6. The method according to claim 5, wherein the particular threshold is about 10%.

7. The method according to claim 5, further comprising determining the particular threshold based on a coherence bandwidth of the mobile device.

8. A controller for a wireless network configured to transition between predictive allocation and mobile-assisted spectral allocation, the controller comprising:
   a communication module configured to communicate with a plurality of mobile devices over a wireless network, wherein a mobile device from the plurality of mobile devices is configured to monitor an actual number of bits received as a transmission moves along a present spectral path, and compare the actual number of bits received to a scheduled number of bits;
   a processor coupled to the communication module, the processor configured to:
   receive information pertaining to a preferred spectral path from the mobile device in response to a determination by the mobile device that the actual number of bits received is less than the scheduled number of bits by a threshold, wherein the preferred spectral path for the mobile device comprises a subset of time-frequency vectors allocated to the mobile device with signal-to-noise ratios (SNRs) higher than a predefined threshold;

select a particular nearby cluster for the preferred spectral path, wherein the particular nearby cluster corresponds to spatial and temporal grid points near present space-time coordinates of the mobile device; and in response to a determination that the particular nearby cluster has a time-frequency vector distance that is less than a particular threshold when compared to the preferred spectral path schedule a next transmission for the mobile device at one or more time-frequency vectors in the particular nearby cluster.

9. The controller according to claim 8, wherein the processor is configured to receive the information pertaining, to the preferred spectral path by receiving sub-carrier specification information for one or more preferred sub-carriers from the mobile device.

10. The controller according to claim 8, wherein the processor is further configured to use a string matching technique to determine if the preferred spectral path and the particular nearby cluster match the predefined criterion.

11. The controller according to claim 8, wherein the processor is further configured to receive the preferred spectral path information from the mobile device in form of channel state information (CSI).

12. The controller according to claim 8, wherein the processor is further configured to schedule the next transmission at the preferred spectral path if the predefined criterion is not matched.

13. The controller according to claim 8, wherein the particular nearby duster is a duster that corresponds to spatial and/or temporal arid points surrounding present space and/or time coordinates of the mobile device.

14. The controller according to claim 8, wherein the controller is part of a base station.

15. The controller according to claim 8, wherein the wireless network is one of an Evolved Universal Mobile Telecommunications System Terrestrial Radio Access Network (eUTRAN), a long term evolution (LTE) network, an LTE-Advanced network, a high speed packet access (HSPA) network, or an advanced HSPA network.

* * * * *

UNITED STATES PATENT AND TRADEMARK OFFICE
CERTIFICATE OF CORRECTION

PATENT NO. : 9,554,293 B2
APPLICATION NO. : 14/354116
DATED : January 24, 2017
INVENTOR(S) : Keerthi It is certified that error appears in the above-identified patent and that said Letters Patent is hereby corrected as shown below:

On the Title Page

Item [57], Line 4, delete "theft" and insert -- their --, therefor.

In the Specification

Column 1, Line 9, delete "§371" and insert -- § 371 --, therefor.

Column 1, Line 11, delete "filed Jun. 11, 2013," and insert -- filed on Jun. 11, 2013, --, therefor.

Column 4, Lines 58-59, delete "and/or quality" and insert -- and/or a quality --, therefor.

Column 7, Line 63, delete "anew" and insert -- a new --, therefor.

Column 8, Line 3, delete "anew" and insert -- a new --, therefor.

Column 9, Line 40, delete "sub-carders 536." and insert -- sub-carriers 536. --, therefor.

Column 14, Line 45, delete "good duster" and insert -- good cluster --, therefor.

In the Claims

Column 20, Line 37, Claim 5, delete "selecting," and insert -- selecting --, therefor.

Column 20, Line 39, Claim 5, delete "duster" and insert -- cluster --, therefor.

Column 21, Line 8, Claim 8, delete "path" and insert -- path, --, therefor.

Column 22, Line 8, Claim 13, delete "duster is a duster" and insert -- cluster is a cluster --, therefor.

Signed and Sealed this
Fourth Day of April, 2017

Michelle K. Lee
*Director of the United States Patent and Trademark Office*